United States Patent
Tjerrild

(10) Patent No.: US 7,651,056 B2
(45) Date of Patent: Jan. 26, 2010

(54) METHOD OF MOUNTING SUPPORT ASSEMBLIES FOR PIPES, CONDUITS AND TUBES

(75) Inventor: James William Tjerrild, Fresno, CA (US)

(73) Assignee: Potential Design, Inc., Fresno, CA (US)

( * ) Notice: Subject to any disclaimer, the term of this patent is extended or adjusted under 35 U.S.C. 154(b) by 471 days.

(21) Appl. No.: 11/249,131

(22) Filed: Oct. 12, 2005

(65) Prior Publication Data
US 2006/0178246 A1 Aug. 10, 2006

Related U.S. Application Data

(63) Continuation-in-part of application No. 11/053,216, filed on Feb. 8, 2005, now abandoned.

(51) Int. Cl.
*E21F 17/02* (2006.01)
(52) U.S. Cl. .............................. 248/58; 248/59; 248/62; 52/167.1
(58) Field of Classification Search .................... 248/58, 248/59, 61, 62, 72, 74.1, 317; 52/167.1, 52/713, 39
See application file for complete search history.

(56) References Cited

U.S. PATENT DOCUMENTS

| | | | | | |
|---|---|---|---|---|---|
| 3,854,684 | A | * | 12/1974 | Moore | 248/68.1 |
| 3,981,469 | A | * | 9/1976 | Torbet et al. | 248/235 |
| 4,065,218 | A | * | 12/1977 | Biggane | 403/71 |
| 4,078,752 | A | * | 3/1978 | Kindorf | 248/62 |
| 5,188,317 | A | * | 2/1993 | Roth | 248/59 |
| 5,412,843 | A | * | 5/1995 | Krongauz et al. | 16/387 |
| 5,653,426 | A | * | 8/1997 | Meisel | 267/71 |
| 6,050,035 | A | * | 4/2000 | Thompson et al. | 52/167.1 |
| 6,415,560 | B1 | * | 7/2002 | Rinderer | 52/167.1 |

OTHER PUBLICATIONS 10 photographs of conventional brackets sold before Jan. 28, 2003.
Press Release dated Jan. 28, 2003.
Two photographs showing wall mount and trapeze struts sold prior to Jan. 28, 2003.
"Unistrut Product Application Guide IND 800," in existence prior to Feb. 8, 2005, pp. 1, 6-9, 26, 28-33 and 48, Wayne, MI.

* cited by examiner

*Primary Examiner*—Anita M King
(74) *Attorney, Agent, or Firm*—James F. Hann; Haynes Beffel & Wolfeld LLP

(57) ABSTRACT

Wall-mounted type and trapeze type support strut assemblies attach pipes, conduit, and tubes to vertical and horizontal surfaces in a sanitary manner. The strut assemblies repel contaminants, are easy to inspect, and easy to clean. Structures to provide seismic stability to trapeze type support strut assemblies may also be used.

4 Claims, 5 Drawing Sheets

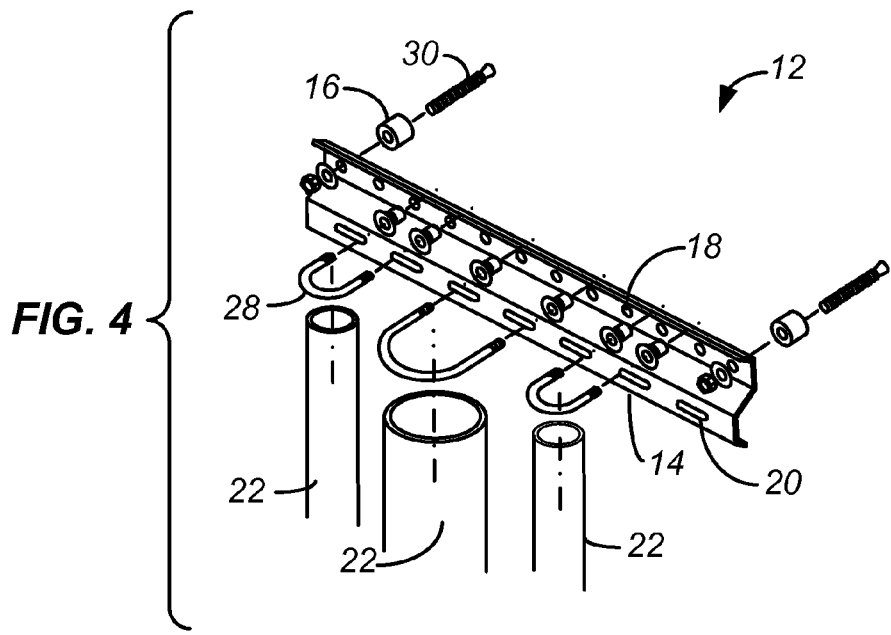
FIG. 4
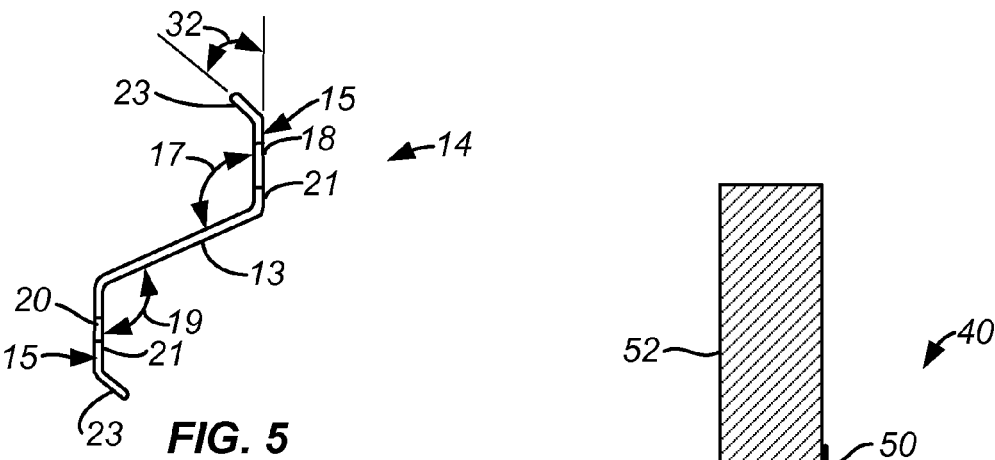
FIG. 5
FIG. 6
FIG. 7

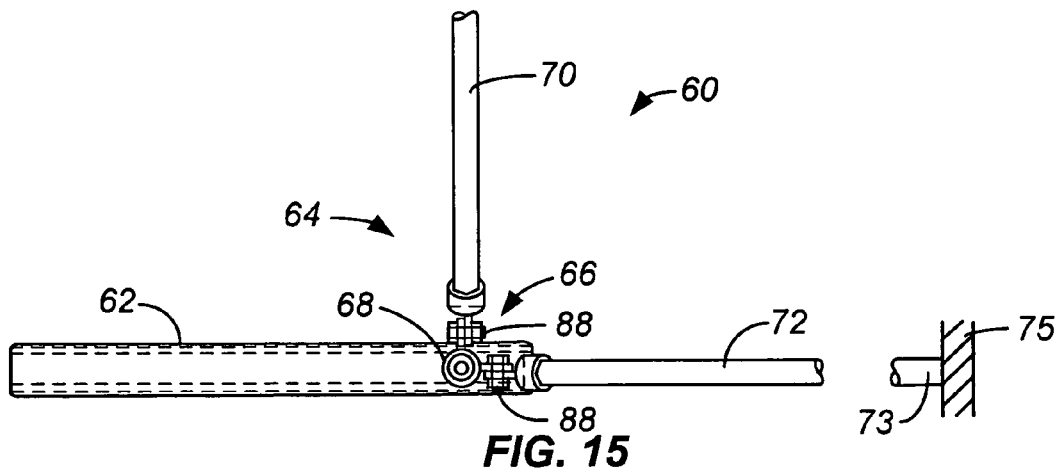
FIG. 15
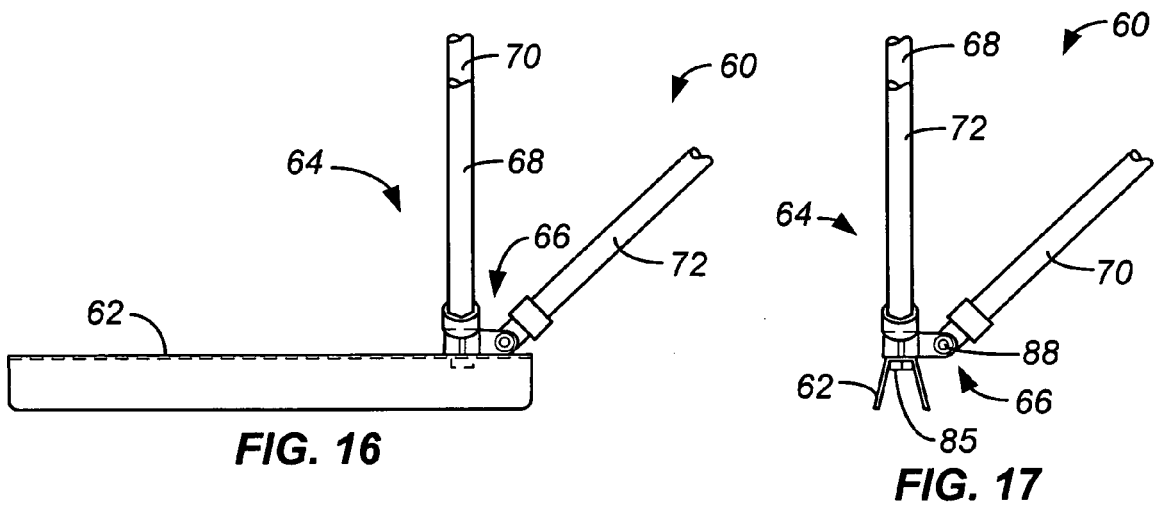
FIG. 16
FIG. 17
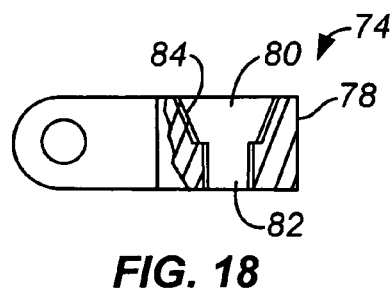
FIG. 18
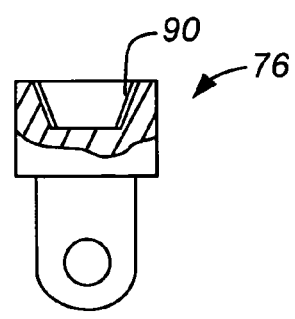
FIG. 20
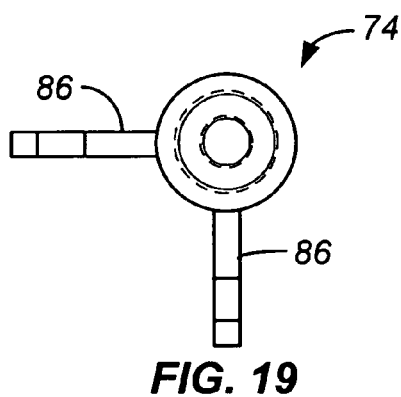
FIG. 19
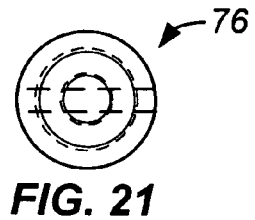
FIG. 21

METHOD OF MOUNTING SUPPORT ASSEMBLIES FOR PIPES, CONDUITS AND TUBES

CROSS-REFERENCE TO RELATED APPLICATIONS

This is a continuation in part patent application of U.S. patent application Ser. No. 11/053,216 filed 8 Feb. 2005 entitled Sanitary Pipe Mounting System.

STATEMENT REGARDING FEDERALLY SPONSORED RESEARCH OR DEVELOPMENT

Not Applicable.

BACKGROUND OF THE INVENTION

The present invention is intended to be used, for example, in food processing and pharmaceutical processing facilities to improve the inspectability and cleanability of pipe, conduit, and tube installations. Currently, these facilities are forced to use conventional mounting systems to install pipe, conduit, and tube. The conventional mounting systems are inherently dirty. Also, the conventional mounting systems are exceedingly difficult to inspect and clean.

BRIEF SUMMARY OF THE INVENTION

The invention is directed to a system for mounting pipe, conduit, and tube in, for example, food grade or pharmaceutical grade installations. The invention is designed such that it resists contamination, is easy to inspect, and is easy to clean.

A first aspect of the invention is directed to a support assembly for mounting to an upright support, such as a wall. The assembly comprises a strut having a central section and first and second end parts. The end parts extend from the central section at angles between 100° and 130°. The support assembly also comprises an upright support fastener assembly, secured to the first end part, comprising: an anchor engaging the first end part and engageable with an upright support; and a spacer positionable between the first end part and the upright support, the spacer having no horizontally oriented surfaces. The support assembly further includes a supported element fastener assembly securable to the second end part and to a supported element. The support assembly enhances sanitation by effectively eliminating horizontal surfaces and by spacing the strut away from the upright support. In some embodiments the strut has no unused holes opening into the ambient environment.

A second aspect of the invention is directed to a method for mounting a supported element to an upright support. A support assembly is selected. The support assembly includes a strut, having a central section and first and second end parts extending from the central section, and an upright support fastener assembly, securable to the first end part. The upright support fastener assembly includes an anchor, engageable with the first end part and with an upright support, and a spacer positionable between the first end part and the upright support. The support assembly also includes a supported element fastener assembly securable to the second end part. The first end part of the strut is mounted to the upright support using the upright support fastener assembly. The supported element is secured to the second end part of the strut. Sanitation is enhanced by effectively eliminating horizontal surfaces and by spacing the strut away from the upright support with the spacer. In some embodiments enhancing sanitation may include minimizing any exposed threaded surfaces. In some embodiments enhancing sanitation may include eliminating any unused holes in the strut.

A third aspect of the invention is directed to a trapeze type support assembly for mounting to an overhead support. The trapeze type support assembly includes a strut, a support bracket assembly and a supported element fastener assembly. The strut has a base, the base having an upper surface and a lower surface. The strut also has first and second legs extending downwardly and outwardly from the lower surface of the base at angles of more than 180° from the upper surface. The support bracket assembly is secured to the base and comprises a bracket, engageable with an overhead support, and a hangar element, supported by the bracket and extending from the bracket to the base with the hangar element secured to the base, the hangar element having a smooth surface between the bracket and the base. The supported element fastener assembly is securable to the base so to secure a supported element to the upper surface of the base of the strut. The support assembly enhances sanitation by effectively eliminating any upwardly-facing, contaminant-collecting trough in the strut and by effectively eliminating contaminant-collecting threaded surfaces on the hangar rod between the bracket and the base. According to some embodiments, the support bracket assembly may comprise a seismic adapter securing the hangar element to the base and first and second lateral support members secured to the seismic adapter at an acute angle to horizontal. The lateral support members have distal ends secured to a building support member so to provide seismic stability to the strut, the lateral support members also having smooth outer surfaces to enhance sanitation.

A fourth aspect of the invention is directed to a method for mounting a supported element to an overhead support. The method includes selecting a trapeze type support assembly comprising a strut, a support bracket assembly in a supported element fastener assembly. The strut has a base, the base having an upper surface and a lower surface, the strut also having first and second legs extending downwardly and outwardly from the lower surface of the base at angles of more than 180° from the upper surface. The support bracket assembly is secured to the base and comprises a bracket, engageable with an overhead support, and a hangar element, supported by the bracket and extending from the bracket to the base with the hangar element secured to the base, the hangar element having a smooth surface between the bracket and the base. The supported element fastener assembly is securable to the base so to secure a supported element to the upper surface of the base of the strut. The strut is suspended from the overhead support with the bracket secured to the overhead support and the hangar rod connecting the strut to the bracket. The supported element is secured to the upper surface of the base of the strut using the supported element fastener assembly. Sanitation is enhanced by effectively eliminating any upwardly-facing, contaminant-collecting trough in the strut, and by effectively eliminating contaminant-collecting threaded surfaces on the hangar rod between the bracket and the base. Sanitation may also, in some embodiments, be enhanced by eliminating any unused holes in the strut. According to some embodiments, the support assembly selecting step may comprise selecting a support bracket assembly comprising a seismic adapter securing the hangar element to the base and first and second lateral support members secured to the seismic adapter at acute angles to horizontal, the lateral support members having distal ends, the lateral support members also having smooth outer surfaces to enhance sanitation. The strut is seismically supported in such embodiments by securing the distal ends of the lateral support members to a building support member.

Various features and advantages of the invention will appear from the following description in which the preferred embodiments have been set forth in detail in conjunction with the accompanying drawings.

BRIEF DESCRIPTION OF THE SEVERAL VIEWS OF THE DRAWING(S)

FIG. 4 is an exploded isometric assembly of the assembly of FIG. 1;

FIG. 5 is an end view of the wall-mounted strut of FIG. 1;

FIG. 6 is a top view of trapeze type support strut assembly;

FIG. 7 is a side view of the assembly of FIG. 6;

FIGS. 15-21 disclose a trapeze type of support strut assembly designed for both enhanced cleanliness and seismic stability.

DETAILED DESCRIPTION OF THE INVENTION

Figure 1:
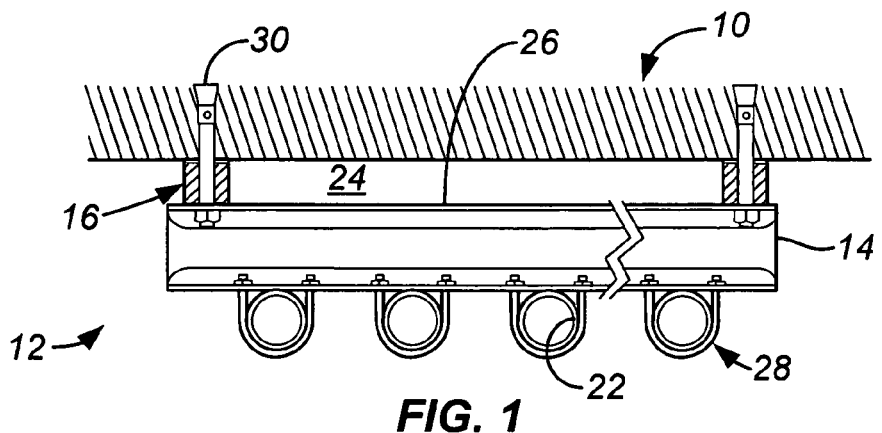
FIG. 1 is a top view of a wall mounted type of support strut assembly.

The following description of the invention will typically be with reference to specific structural embodiments and methods. It is to be understood that there is no intention to limit the invention to the specifically disclosed embodiments but that the invention may be practiced using other features, elements, methods and embodiments.

The invention is directed to wall-mounted type of mounting system and a trapeze type of mounting system typically used to sanitarily mount pipes, conduits, and tubes to vertical and horizontal surfaces in locations that require a high degree of cleanliness. These mounting systems would typically be employed in, for example, food processing and pharmaceutical installations.

In the past, these facilities have had only conventional strut systems to mount their pipes, conduit, and tubes. This has been a major food and drug safety problem, as conventional strut systems are easily soiled, harbor contaminants, are difficult to inspect, and difficult to clean.

Mounting systems made according to the invention are typically configured for two general applications. When mounting pipes, conduits, or tubes to a wall 10 (or other vertical or generally vertical surface), the wall-mounted type of support strut assembly 12 (shown in FIGS. 1-5) is preferred. The main components of this assembly are wall mount strut 14 and multiple spacers 16. The wall mount strut 14 may be punched and cold formed from 12 gauge T304 stainless steel sheet that is polished to a #4 sanitary finish. Other materials and fabrication techniques may also be used. The multiple punched holes 18 and slots 20 permit mounting of the strut 14 to the wall 10 and pipes 22 to the strut in multiple locations.

Figure 2:
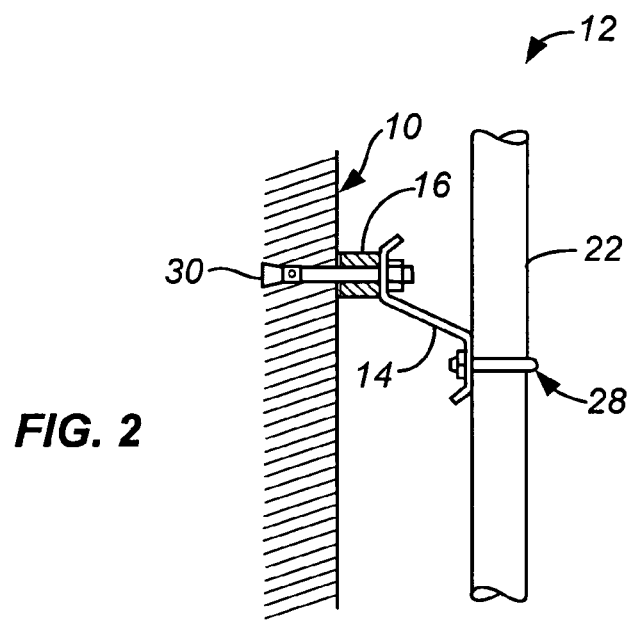
FIG. 2 is a side view of the assembly of FIG. 1.

An important aspect of the invention is that the cross section of the strut 14 has no horizontal surfaces (see FIG. 2). Conventional struts typically have multiple horizontal surfaces. The configuration of strut 14 is better than conventional strut, in that is tends to shed falling contaminants downward, as opposed to collecting them. The wall mount spacers 16 are typically machined from solid 1" diameter T304 stainless steel round bar. The spacers 16 preferably hold the strut 14 away from the wall 10 at a distance of not less than 1". Conventional strut systems typically mount the strut directly to, that is in contact with, the wall. Assembly 12 is also better than conventional systems in that this gap 24 between the wall 10 and the back 26 of the strut 14 facilitates inspection, cleaning, and allows falling contaminants and water from wash downs to fall through this gap and downward. Conversely, the back surface of conventional strut is mounted directly to the wall and is therefore not easily inspectable or cleanable, and may harbor filth and mildew. The pipes 22, conduits, or tubes are preferably attached to the wall mount strut 14 with stainless steel U-bolts 28 of minimum thread length, as threads are difficult to clean. The entire assembly may be attached to the wall 10 with ⅜ diameter stainless steel wedge anchors 30 (see FIG. 4).

Strut 14 includes a central section 13 and end parts 15. The end parts 15 preferably extend from the central section at angles 17, 19 of between about 100° and 130°, and more preferably about 115°. Central section 13 preferably extends at an angle to the horizontal of about 10° to 40°, and more preferably about 25°. End parts 15 each comprise a main portion 21 and a secondary, outer portion 23, the outer portions preferably extending from the main portions at an angle 32 of between about 30° and 60°, and more preferably about 45°.

To mount pipes 22, conduits, or tubes below a ceiling (or other horizontal surfaces), the trapeze type of support strut assembly 40 (shown in FIGS. 6-10) is preferred. The main components of this assembly 40 are trapeze mount strut 42 and smooth hanger rods 44. The trapeze mount strut 42 is punched and cold formed from 12 gauge T304 stainless steel sheet that is polished to a #4 sanitary finish. The multiple punched holes 46 and slots 48 permit mounting of strut 42 to ceiling and pipes 22 to strut 42 in multiple locations. In this embodiment strut 42 is an open C-channel with legs 47 pointing downward. Conventional trapeze struts are closed C-channels with hemmed legs that point upward. Strut 42 has a base of 41 with upper and lower surfaces 43, 45 and legs 47 extending downwardly and outwardly from the lower surface at angles 49 of greater than 180° from upper surface 43.

Assembly 40 is better than conventional strut systems, in that the legs 47 of trapeze mount strut 42 are open, not hemmed, and point downward, thus allowing easy inspection, cleaning, and eliminates the upward facing troughs of conventional trapeze mount struts that collect and hold contaminants. Conversely, conventional trapeze mount installations have upward facing channels that trough to hold falling debris, and wash down water. Their design is so enclosed as to require disassembly for cleaning in some cases to achieve an adequate level of sanitation.

The smooth hanger rods 44 are preferably fabricated from T304 stainless steel schedule 80 pipe. They are tapped in each end for ⅜" national coarse threads, and the outer surface is polished to a #4 sanitary finish. Conventional trapeze struts are typically mounted with continuously threaded rod. Trapeze type of support strut assembly 40 is better than conventional strut assemblies because the smooth hanger rods 44 are easy to clean, where as the outer surfaces of the conventional strut's continuously threaded rods are so convoluted, that they are extremely difficult to satisfactorily clean. The pipes, conduits and tube are attached to the trapeze mount strut with the same stainless steel, minimum thread U-bolts 28 used for wall mount strut 14. The entire trapeze type of support strut assembly 40 is typically attached to the ceiling, such as to ceiling member 52, with L-brackets 50.

Overall, stainless steel strut assemblies 12, 40 provide a means by which one can attach pipes, conduits, and tubes to horizontal and vertical surfaces in a sanitary way. This level of inspectability and cleanability is not provided by conventional struts currently on the market.

Figure 3:
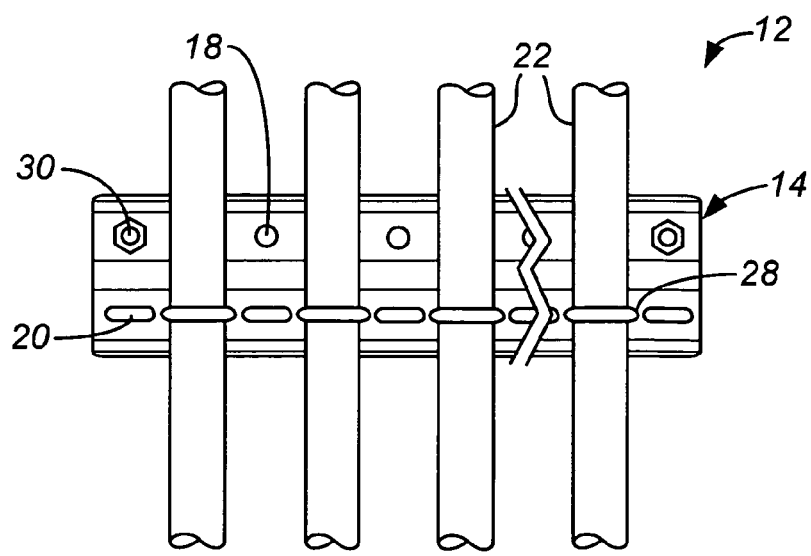
FIG. 3 is a front view of the assembly of FIG. 1.
Figure 8:
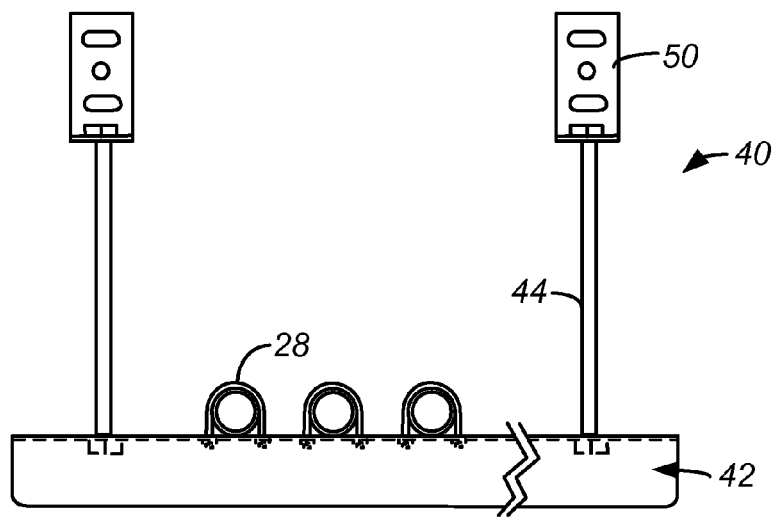
FIG. 8 is a front view of the assembly of FIG. 6.
Figure 9:
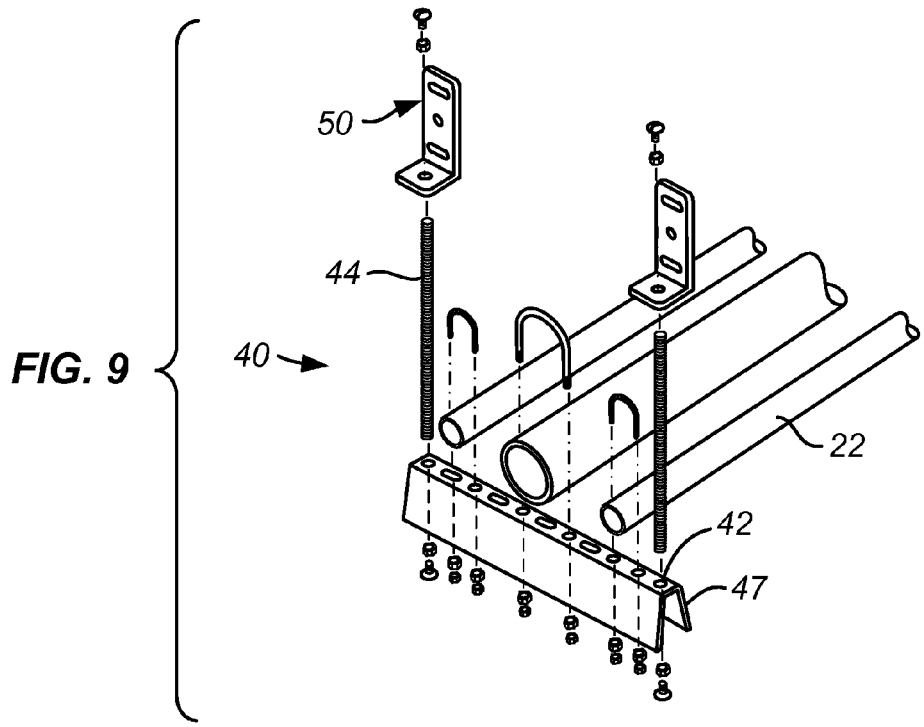
FIG. 9 is an exploded isometric assembly of the assembly of FIG. 6.
Figure 10:
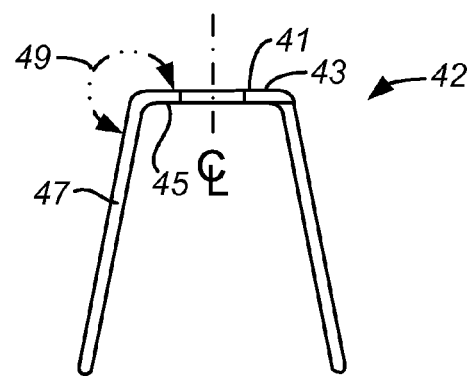
FIG. 10 is an end view of the trapeze mount strut of FIG. 6.
Figure 11:
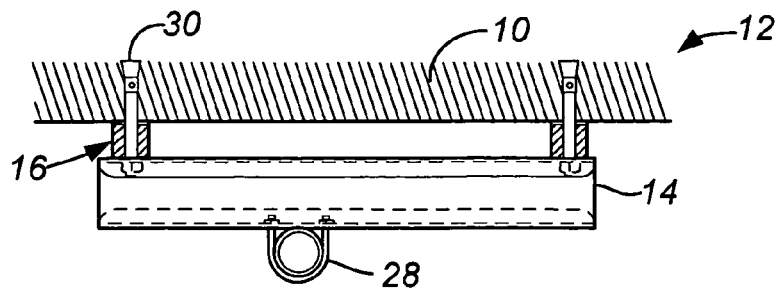
FIGS. 11 and 12 are views similar to FIGS. 1 and 3 of a wall-mounted type of support strut assembly.
Figure 12:
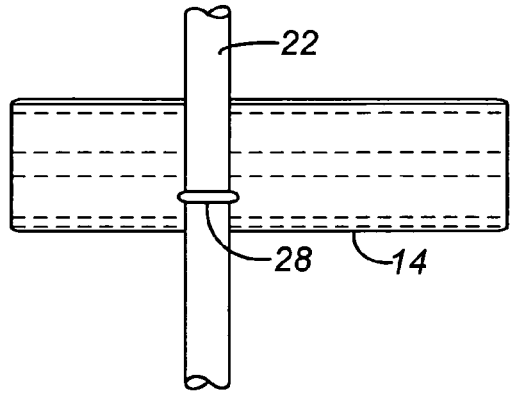
Figure 13:
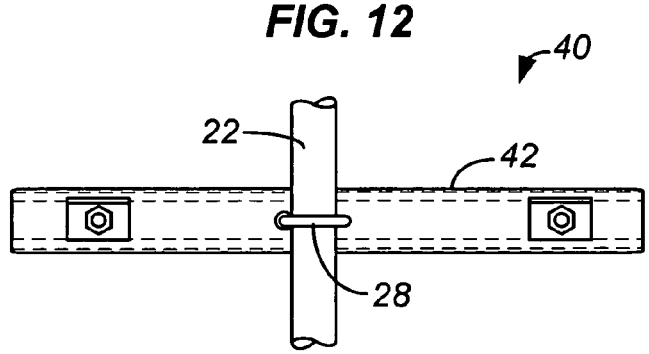
FIGS. 13 and 14 are views similar to FIGS. 6 and 8 of a ceiling-mounted, trapeze type of support strut assembly.
Figure 14:
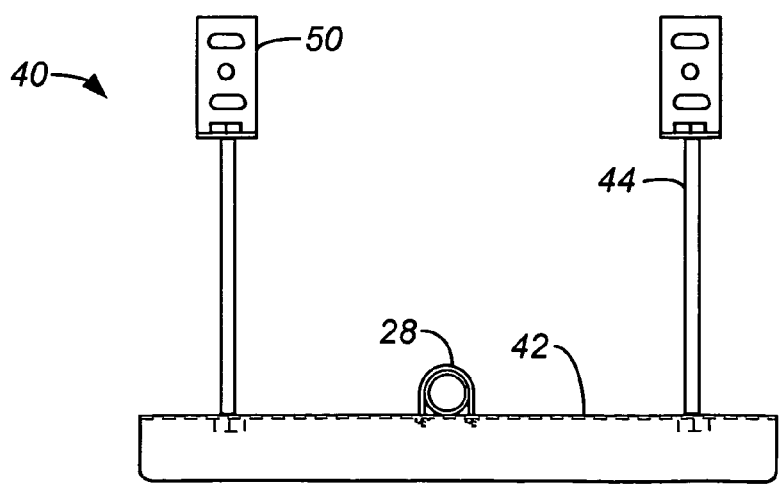

FIGS. 11 and 12 are views similar to FIGS. 1 and 3 of a wall-mounted type of support strut assembly with like references referring to like elements. FIGS. 13 and 14 are views similar to FIGS. 6 and 8 of a ceiling-mounted (or other overhead structure-mounted) trapeze type of support strut assembly with like reference numerals referring to like elements. In both embodiments extra holes and slots have been eliminated from struts 12 and 42 with mounting hardware attached only where needed. The primary advantage from the embodiments of FIGS. 11-14 is the elimination of unnecessary holes, slots and other voids in struts 14, 42 to further enhance sanitation. In the wall-mounted type of strut assembly 12 of FIGS. 11-12, the supporting structure is secured to the strut 14 by drilling holes in the strut, typically in the field to obtain precise, proper placement, to accommodate wedge anchors 30 and U-bolts 28. With the trapeze type of strut assembly 40 of FIGS. 13 and 14, holes are drilled in strut 42 to accommodate hanger rods 44 and U-bolts 28. The mounting hardware is typically mounted in the field by drilling holes in the struts or by welding, or otherwise affixing, the mounting hardware for the tubes, pipes or other conduits to the struts. Other techniques for affixing the mounting hardware to the struts, such through the use of metal strapping or clamps, may also be used. Although the embodiments of FIGS. 11-14 typically require securing the mounting structure along the strut in the field, there is a significant enhancement in the level of sanitation available by eliminating unused holes opening into the ambient environment. The lack of such unused holes not only reduces the total surface area of the strut but also eliminates areas in which dirt, debris and other contaminants can collect.

FIGS. 15-21 disclose a still further embodiment of a trapeze type of support strut assembly designed for both enhanced cleanliness and seismic stability for the pipes, conduits and tubes supported by the assembly. Seismically supported trapeze type of support strut assembly 60 comprises a trapeze type strut 62, similar to the trapeze type strut 42 of FIGS. 13 and 14, supported by a stabilized support assembly 64. Assembly 64 comprises an adapter assembly 66 to which pipes 68, 70 and 72 are threadably mounted. The distal end 73 of each of pipes 68, 70, 72 are secured to a an appropriate building support member 75, such as ceiling member 52 for vertical support pipe 68, using an appropriate bracket or other hardware.

The distal end adapter assembly 66 comprises a vertical adapter 74 and two lateral adapters 76. Vertical adapter 74 has a main, generally cynical body 78 having an open bore 80 therethrough. Open bore 80 has a threaded end 82 adjacent to strut 62 and a pipe threaded end 84. A bolt 85, see FIG. 17, is passed upwardly through a hole formed in strut 62 and into threaded end 82 to secure vertical adapter 74 to strut 62. Vertical support pipe 68 is secured to pipe thread end 84 and provides the main vertical support for strut 62.

Lateral adapters 76 are mounted to laterally extending lugs 86 of vertical adapter 74 by nut and bolt assemblies 88. Assemblies 88 act as pivots to permit lateral support pipes 70, 72 to extend at appropriate angles from adapter assembly 66. Lateral adapters 76 have pipe threaded openings 90 to which lateral support pipes 70, 72 are mounted. As shown in FIGS. 16 and 17, each of the lateral support pipes 70, 72 extends laterally away from adapter assembly 66 at an angle to both the vertical and horizontal. Lateral support pipes 66, 70, 72 are preferably secured to the building or other support structure housing the pipes, tubes or conduits and being supported by strut 62, so that during any seismic event relative movement between the support structure and strut 62 is reduced or minimized.

Other modification and variation can be made to the disclosed embodiments without departing from the subject of the invention as defined in following claims.

Any and all patents, patent applications and printed publications referred to above are incorporated by reference.

What is claimed is:

1. A method for mounting a supported element to an upright support comprising:
    selecting a support assembly comprising:
        a strut having a central section and first and second end parts extending from the central section;
        an upright support fastener assembly, securable to the first end part, comprising:
            an anchor engageable with the first end part and with an upright support; and
            a spacer positionable between the first end part and the upright support; and
        a supported element fastener assembly securable to the second end part;
    mounting the first end part of the strut to the upright support using the upright support fastener assembly to place the strut in a generally horizontal orientation;
    securing the supported element to the second end part of the strut; and
    enhancing sanitation by:
        effectively eliminating horizontal surfaces by carrying out the selecting, mounting and securing steps so that none of the surfaces of the strut is horizontal following the mounting and securing steps;
        spacing the strut away from the upright support with the spacer; and by
        minimizing any exposed threaded surfaces by at least one of minimizing the length of threaded surfaces and covering threaded surfaces.

2. The method according to claim 1 wherein the enhancing sanitation step further comprises eliminating any unused holes in the strut by carrying out the selecting, mounting and securing steps so that during the mounting and securing steps any holes in the strut needed during the mounting and securing steps are formed in the strut as part of the mounting and securing steps.

3. The method according to claim 2 wherein the minimizing step comprises minimizing any exposed threaded surfaces by at least minimizing the length of threaded surfaces and covering threaded surfaces.

4. The method according to claim 1 wherein the minimizing step comprises minimizing any exposed threaded surfaces by at least minimizing the length of threaded surfaces and covering threaded surfaces.

* * * * *

UNITED STATES PATENT AND TRADEMARK OFFICE
CERTIFICATE OF CORRECTION

| | | |
|---|---|---|
| PATENT NO. | : 7,651,056 B2 | Page 1 of 1 |
| APPLICATION NO. | : 11/249131 | |
| DATED | : January 26, 2010 | |
| INVENTOR(S) | : Tjerrild | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 889 days.

Signed and Sealed this
Twenty-eighth Day of December, 2010

David J. Kappos
*Director of the United States Patent and Trademark Office*